(12) United States Patent
Beniya

(10) Patent No.: US 8,031,779 B2
(45) Date of Patent: Oct. 4, 2011

(54) EXTERNAL-DEVICE CONTROL APPARATUS AND SYSTEM

(75) Inventor: Eriko Beniya, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1471 days.

(21) Appl. No.: 11/414,293

(22) Filed: May 1, 2006

(65) Prior Publication Data

US 2006/0259615 A1    Nov. 16, 2006

(30) Foreign Application Priority Data

May 10, 2005  (JP) ................................. 2005-137588
Mar. 29, 2006  (JP) ................................. 2006-090720

(51) Int. Cl.
*H04N 7/18* (2006.01)
(52) U.S. Cl. .............................. 375/240.25; 375/240.01
(58) Field of Classification Search . 375/240.01–240.29
See application file for complete search history.

(56) References Cited

U.S. PATENT DOCUMENTS 7,509,430 B2 *   3/2009   Oota ............................ 709/229

FOREIGN PATENT DOCUMENTS

| JP | 2000-164371 | 6/2000 |
| JP | 2000-196970 | 7/2000 |
| JP | 2003-283956 | 10/2003 |
| JP | 2004-104752 | 4/2004 |
| JP | 2006-020293 | 1/2006 |
| WO | 2004/006578 A2 | 1/2004 |

* cited by examiner

*Primary Examiner* — Andy Rao
(74) *Attorney, Agent, or Firm* — Louis Woo

(57) ABSTRACT

In an external-device control apparatus, a first section extracts a prescribed descriptor from program specific information in a transport stream. A second section analyzes information represented by the extracted prescribed descriptor to obtain an analyzation result. A third section stores information about setting of operation of an external device. A fourth section generates a signal for control of the operation of the external device in response to the obtained analyzation result according to the information stored in the third section. The fourth section sends the generated signal to the external device.

5 Claims, 15 Drawing Sheets

FIG. 2

| BROADLY CLASSIFIED GENRE INFORMATION | DESCRIPTION CONTENTS |
|---|---|
| 0x0 | NEWS·REPORTS |
| 0x1 | SPORTS |
| 0x2 | INFORMATION·WIDE SHOW |
| 0x3 | DRAMA |
| 0x4 | MUSIC |
| 0x5 | VARIETY |
| 0x6 | MOVIE |
| 0x7 | ANIMATION·SPECIAL SHOTS |
| 0x8 | DOCUMENTARY·CULTURE |
| 0x9 | THEATER·PUBLIC PERFORMANCE |
| 0xA | HOBBY·EDUCATION |
| 0xB | WELFARE |
| 0xC-0xD | RESERVED |
| 0xE | EXTENSION |
| 0xF | OTHER |

US 8,031,779 B2

EXTERNAL-DEVICE CONTROL APPARATUS AND SYSTEM

BACKGROUND OF THE INVENTION

1. Field of the Invention

This invention generally relates to an external-device control apparatus, and also a system including an external device and a control apparatus for the external device. This invention particularly relates to an apparatus for extracting PSI (program specific information) from a transport stream generated in conformity with the MPEG2 (Moving Picture Experts Group 2) standards, and controlling an external device in response to the extracted PSI. In addition, this invention particularly relates to a system including such a control apparatus and an external device.

2. Description of the Related Art

A plurality of content programs (for example, television programs) can be transmitted on a multiplexed basis through the use of a transport stream (TS) generated in conformity with the MPEG2 standards. Program specific information (PSI) is contained in the transport stream. The PSI identifies what parts of the transport stream belong to a particular content program among the plural content programs. Specifically, the PSI includes information for identifying necessary packets (desired packets) from the transport stream in which the plural content programs are multiplexed. Accordingly, a reception side can select desired one from the plural content programs by extracting the PSI from the transport stream and then referring to the extracted PSI.

The PSI complies with the ISO/IEC13818-1 standards. In general, the PSI includes a program association table (PAT), a program map table (PMT), and a selection information table (SIT). There are various descriptors in these tables (for example, a PMT and a SIT) which are classified according to use.

Japanese patent application publication number 2004-104752 discloses a digital broadcast receiving apparatus including a storage unit, a first controller, a memory, a second controller, and an interface. The first controller and the second controller are formed by a common CPU. The first controller loads the storage unit with a partial TS (transport stream) extracted from a received TS. The partial TS includes elementary streams (ES) representative of a selected content program, and control information for the selected content program. The first controller generates program accessory information from the control information in the partial TS which occurs before being loaded into the storage unit. The program accessory information includes copy control information and packet identification information. The program accessory information is referred to when the partial TS is outputted to an external recording device from the storage unit. The memory stores the program accessory information in a manner having a correspondence with the partial TS in the storage unit. The second controller issues the interface a command to update the control information in the partial TS according to the program accessory information. Furthermore, the second controller issues the interface a command to read out the partial TS from the storage unit. When receiving the commands from the second controller, the interface reads out the partial TS from the storage unit and updates the control information according to the program accessory information. Then, the interface outputs the read-out partial TS to the external recording device.

In the apparatus of Japanese application 2004-104752, the control information in the partial TS extracted from the received TS includes a PMT having copy control information. The first controller extracts the copy control information from the PMT, and uses the extracted copy control information as a part of the program accessory information. In the case where the copy control information in the partial TS extracted from the received TS is in a "copy-once" state, the copy control information is changed to a "no-more-copies" state before the partial TS is stored into the storage unit. Therefore, in this case, the copy control information in the program accessory information in the memory is in the "copy-once" state while the copy control information in the partial TS in the storage unit is in the "no-more-copies" state. When the second controller receives user's request to move the partial TS from the storage unit, the second controller refers to the copy control information in the program accessory information. In the case where the copy control information in the program accessory information is in the "copy-once" state, the second controller commands the interface to read out the partial TS from the storage unit and to update the copy control information in the read-out partial TS from the "no-more-copies" to the "copy-once" state. In addition, the second controller commands the interface to update move-related information in the PMT in the partial TS from a "non-move" state to an "in-move" state. Furthermore, the second controller commands the interface to output the partial TS inclusive of the updated copy control information to the external recording device. When the second controller receives user's request to copy the partial TS in the storage unit, the second controller refers to the copy control information in the program accessory information. In the case where the copy control information in the program accessory information is in the "copy-once" state, the second controller commands the interface to inhibit the transmission of the partial TS from the storage unit to the external recording device.

In the apparatus of Japanese application 2004-104752, the copy control information is represented by a descriptor in the PMT which is contained in PSI (program specific information). There are various descriptors in the PSI such as a component descriptor indicating the type of a component signal and a content descriptor indicating the genre of a content program. It is desirable to more effectively use such descriptors.

SUMMARY OF THE INVENTION

It is a first object of this invention to provide an apparatus for controlling an external device in response to information represented by a descriptor contained in PSI of an MPEG2-TS (a transport stream complying with the MPEG2 standards).

It is a second object of this invention to provide a system including a combination of an external device and an apparatus for controlling the external device in response to information represented by a descriptor contained in PSI of an MPEG2-TS.

A first aspect of this invention provides an external-device control apparatus comprising first means for extracting a prescribed descriptor from program specific information in a transport stream; second means for analyzing information represented by the extracted prescribed descriptor to obtain an analyzation result; third means for storing information about setting of operation of an external device; and fourth means for generating a signal for control of the operation of the external device in response to the analyzation result obtained by the second means according to the information stored in the third means, and sending the generated signal to the external device.

A second aspect of this invention provides an external-device control apparatus comprising first means for extracting a prescribed descriptor from program specific information in a transport stream; second means for sending the prescribed descriptor extracted by the first means to an external device; and third means for enabling the external device to be controlled in response to the prescribed descriptor sent by the second means.

A third aspect of this invention provides a system comprising a decoding apparatus; an external device; first means provided in the decoding apparatus for extracting a prescribed descriptor from program specific information in a transport stream; second means for sending the prescribed descriptor extracted by the first means to the external device; third means provided in the external device for analyzing information represented by the prescribed descriptor sent by the second means to obtain an analyzation result; fourth means provided in the external device for storing an arbitrarily designated operation control parameter which relates to operation of a controllable portion in the external device; fifth means provided in the external device for generating a signal for control of the operation of the controllable portion in the external device in response to the analyzation result obtained by the third means and the arbitrarily designated operation control parameter stored in the fourth means; and sixth means provided in the external device for controlling the operation of the controllable portion in the external device in response to the signal generated by the fifth means.

A fourth aspect of this invention is based on the third aspect thereof, and provides a system wherein the second means comprises means for detecting whether or not connection between the decoding apparatus and the external device is established, means for notifying a user of a connection failure when the connection between the decoding apparatus and the external device is not established, and means for sending the prescribed descriptor to the external device when the connection between the decoding apparatus and the external device is established, and wherein the external device includes means for sending a setting completion notice to the decoding apparatus when the sixth means completes the control of the operation of the controllable portion in the external device.

A fifth aspect of this invention is based on the third aspect thereof, and provides a system wherein the external device includes means for analyzing a descriptor corresponding to a change through manual operation after the sixth means completes the control of the operation of the controllable portion in the external device, and generating an operation log in accordance with the analyzed descriptor, and means for updating the arbitrarily designated operation control parameter stored in the fourth means in accordance with the generated operation log.

BRIEF DESCRIPTION OF THE DRAWINGS

FIG. 2 is a diagram showing an example of the assignment of logic states of broadly classified genre information to content program genres.

DETAILED DESCRIPTION OF THE INVENTION

First Embodiment

Figure 1:
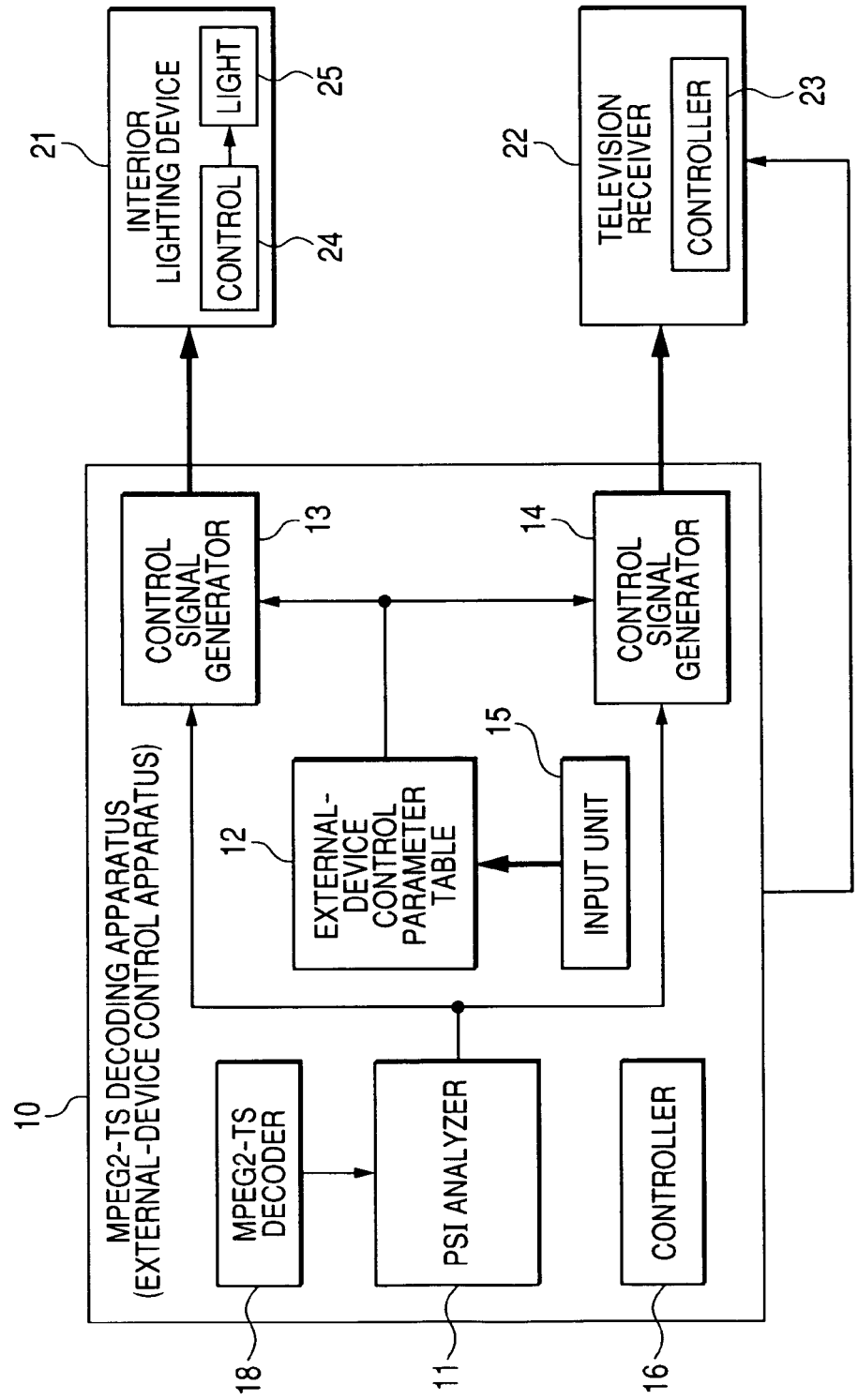
FIG. 1 is a block diagram of an external-device control apparatus and external devices according to a first embodiment of this invention.

FIG. 1 shows an external-device control apparatus 10 according to a first embodiment of this invention. The control apparatus 10 includes a decoding apparatus such as a video disc recorder (VDR) which serves to decode an MPEG2-TS (a transport stream complying with the MPEG2 standards). The control apparatus (the MPEG2-TS decoding apparatus) 10 is connected with external devices including an interior lighting device 21 and a television receiver 22. The control apparatus 10 operates to control the external devices (the interior lighting device 21 and the television receiver 22). Preferably, the interior lighting device 21 and the television receiver 22 are in a common room. The television receiver 22 has a display for indicating pictures.

The control apparatus 10 includes a PSI analyzer 11, a memory storing a signal representative of an external-device control parameter table 12, a control signal generator 13 for the interior lighting device 21, and a control signal generator 14 for the television receiver 22.

The control apparatus 10 utilizes a component descriptor and a content descriptor for controlling the external devices. The component descriptor and the content descriptor are parts of PSI (program specific information).

The component descriptor indicates the type of a component signal. The component descriptor has information representing the aspect ratio related to the component signal, information representing the number of scanning lines constituting a frame or a filed represented by the component signal, and information representing the scanning type related to the component signal. When the information in the component descriptor represents an aspect ratio of 4:3, the control apparatus 10 forces the television receiver 22 to operate in a normal display mode. On the other hand, when the information in the component descriptor represents an aspect ratio of 16:9, the control apparatus 10 forces the television receiver 22 to operate in a wide display mode. In this way, the control apparatus 10 automatically controls the size of a picture indicated by the television receiver 22 according to the aspect ratio information in the component descriptor.

The content descriptor indicates the genre of a related content program. The content descriptor has 4-bit information representing the broadly classified genre of the related content program, and 4-bit information representing the intermediately classified genre of the related content program.

FIG. 2 shows an example of the assignment of logic states of the broadly classified genre information to content program genres, where the logic states are expressed in hexadecimal notation. As shown in FIG. 2, broadly classified genre information of "0x0" is assigned to a content program genre "news and reports". Broadly classified genre information of "0x1" is assigned to a content program genre "sports". Broadly classified genre information of "0x2" is assigned to a content program genre "information and wide show". Broadly classified genre information of "0x3" is assigned to a content program genre "drama". Broadly classified genre information of "0x4" is assigned to a content program genre "music". Broadly classified genre information of "0x5" is assigned to a content program genre "variety". Broadly classified genre information of "0x6" is assigned to a content program genre "movie". Broadly classified genre information of "0x7" is assigned to a content program genre "animation and special shots". Broadly classified genre information of "0x8" is assigned to a content program genre "documentary and culture". Broadly classified genre information of "0x9" is assigned to a content program genre "theater and public performance". Broadly classified genre information of "0xA" is assigned to a content program genre "hobby and education". Broadly classified genre information of "0xB" is assigned to a content program genre "welfare".

The control apparatus 10 includes an input unit (a user interface) 15 and a computer-based controller 16. The input unit 15 can be actuated by a user. The input unit 15 has, for example, an array of keys. When being actuated by the user, the input unit 15 generates a corresponding signal and outputs the generated signal to the controller 16. The controller 16 can access and update the external-device control parameter table 12 in response to the output signal from the input unit 15. Thus, the user can set or update the contents of the external-device control parameter table 12 by actuating the input unit 15. Under the control by the controller 16, information is sent from the external-device control parameter table 12 to the control signal generators 13 and 14. The control signal generator 13 produces a control signal for the interior lighting device 21 in response to the information from the external-device control parameter table 12, and outputs the produced control signal to the interior lighting device 21. The interior lighting device 21 is controlled in accordance with the control signal from the control signal generator 13. The control signal generator 14 produces a control signal for the television receiver 22 in response to the information from the external-device control parameter table 12, and outputs the produced control signal to the television receiver 22. For example, the quality of pictures displayed by the television receiver 22 is controlled in accordance with the control signal from the control signal generator 14. Other conditions of the television receiver 22 may also be controlled.

The controller 16 can read out the signal representative of the external-device control parameter table 12 from the memory before sending the read-out signal to the television receiver 22. The signal representative of the external-device control parameter table 12 is visualized by the display of the television receiver 22. Thus, the external-device control parameter table 12 can be indicated by the television receiver 22. The user monitors the indicated external-device control parameter table 12 when setting or updating the contents thereof by actuating the input unit 15.

Figure 3:
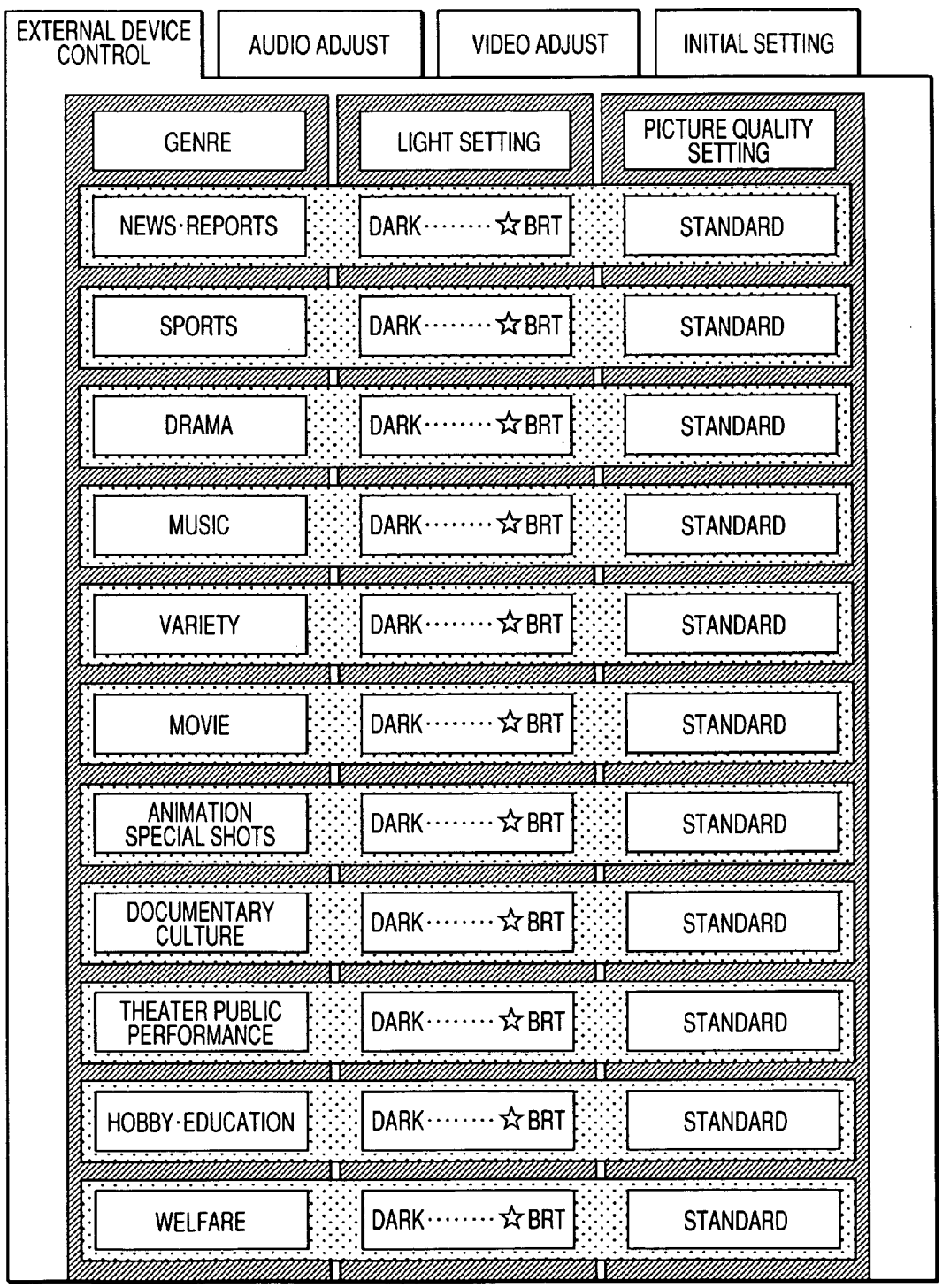
FIG. 3 is a plan view showing an example of an initial setting picture of an external-device control parameter table.

The external-device control parameter table 12 provides a user settable relation among a content program genre, a desired brightness of the interior lighting device 21, and a desired quality of pictures displayed by the television receiver 22. FIG. 3 shows an example of an initial setting picture of the external-device control parameter table 12 which is indicated by the television receiver 22. As shown in FIG. 3, the initial state of the contents of the external-device control parameter table 12 is designed so that the desired brightness of the interior lighting device 21 will be equal to a maximum level and the desired quality of pictures displayed by the television receiver 22 will be equal to a standard-mode level regardless of the content program genre.

Figure 4:
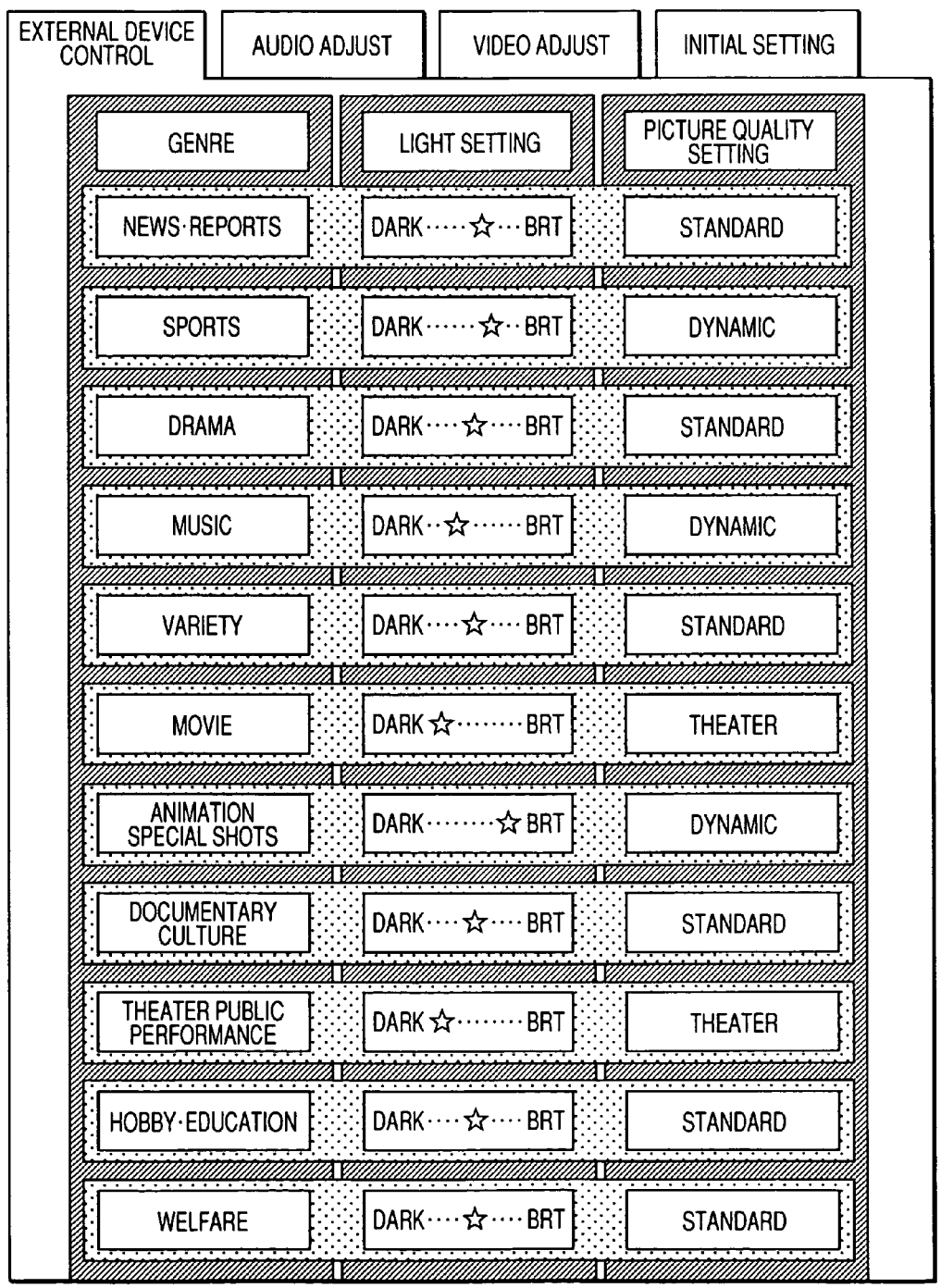
FIG. 4 is a plan view showing an example of a non-initial picture of the external-device control parameter table which results from a change accorded with user's preference.

The contents of the external-device control parameter table 12 can be changed or updated from the initial state in accordance with user's preference as the user actuates the input unit 15. FIG. 4 shows an example of a non-initial picture of the external-device control parameter table 12 which is indicated by the television receiver 22, and which results from a change accorded with user's preference. As shown in FIG. 4, the non-initial state of the contents of the external-device control parameter table 12 is such that the desired brightness of the interior lighting device 21 and the desired quality of pictures displayed by the television receiver 22 depend on the content program genre. In FIG. 4, the desired brightness of the interior lighting device 21 is equal to a minimum level and the desired quality of pictures displayed by the television receiver 22 is equal to a theater-mode level for the content program genre "movie". The desired brightness of the interior lighting device 21 is equal to an intermediate level and the desired quality of pictures displayed by the television receiver 22 is equal to a dynamic-mode level for the content program genre "sports".

The control apparatus 10 includes an MPEG2-TS decoder 18 which receives a transport stream (TS) complying with the MPEG2 standards. The TS comes from, for example, a digital broadcast receiver or an optical disc player/recorder. The MPEG2-TS decoder 18 decodes the received TS to get a decoded video signal representing a desired content program to be reproduced and displayed by the television receiver 22. The decoded video signal is sent from the MPEG2-TS decoder 18 to the television receiver 22. In addition, the MPEG2-TS decoder 18 extracts program specific information (PSI) from the received TS and feeds the extracted PSI to the PSI analyzer 11 while being controlled by the controller 16.

The controller 16 serves to control the PSI analyzer 11, the memory storing the signal representative of the external-device control parameter table 12, the control signal generators 13 and 14, the input device 15, and the MPEG2-TS decoder 18. The controller 16 includes a computer having a combination of an input/output port, a CPU, a ROM, and a RAM. The controller 16 operates in accordance with a computer program stored in the ROM.

Figure 5:
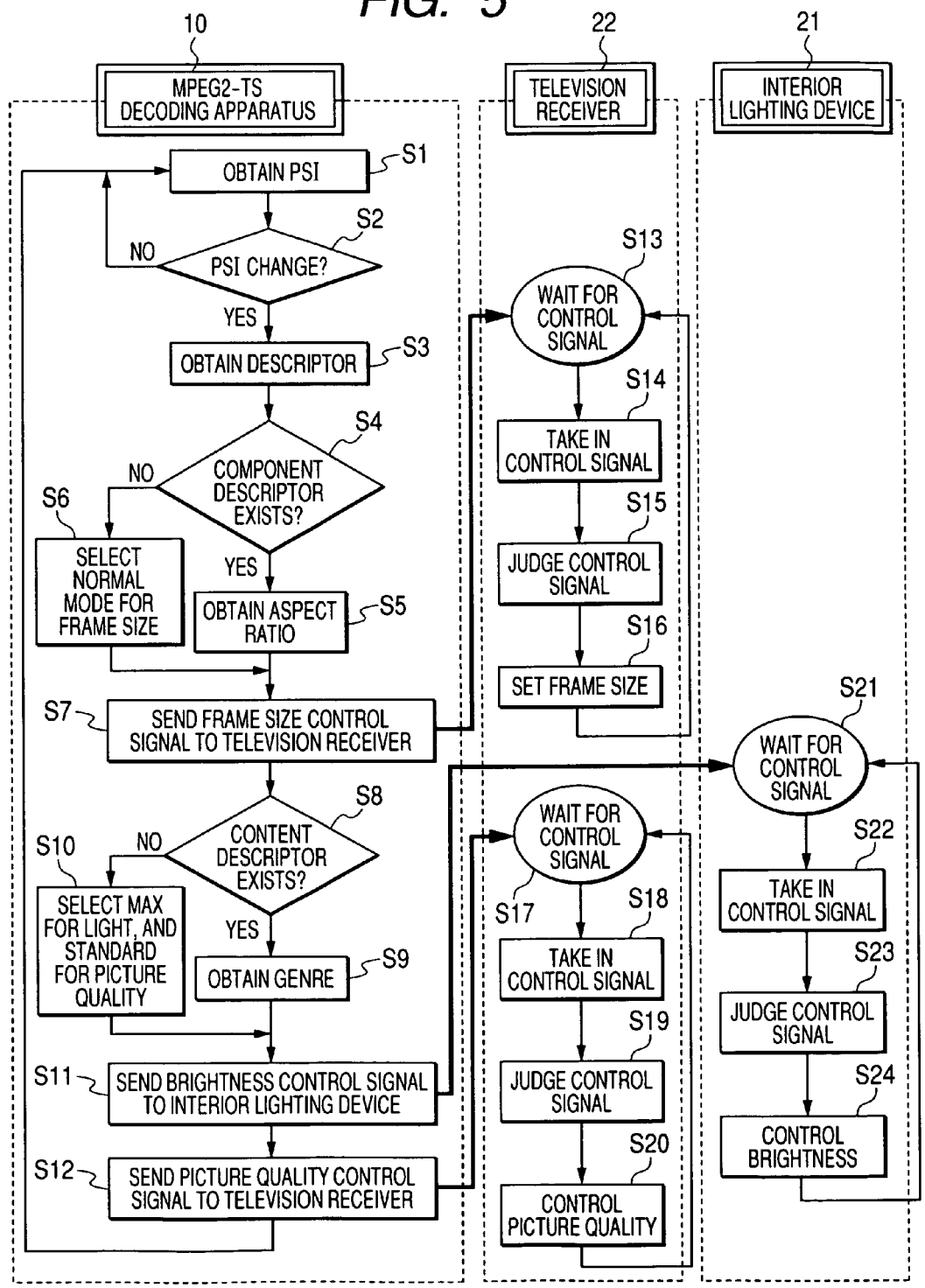
FIG. 5 is a diagram having flowcharts of segments of computer programs for controllers in the external-device control apparatus and the external devices in FIG. 1.

FIG. 5 has a flowchart of a segment of the computer program for the controller 16. As shown in FIG. 5, a first step S1 of the computer program segment controls the MPEG2-TS decoder 18 to extract PSI from a received TS.

A step S2 following the step S1 controls the PSI analyzer 11 to decide whether or not the current extracted PSI is changed from the last extracted PSI. When the current extracted PSI is changed from the last extracted PSI, the computer program advances from the step S2 to a step S3. Otherwise, the computer program returns from the step S2 to the step S1.

The step S3 controls the PSI analyzer 11 to obtain, from the current extracted PSI, descriptors related to a desired content program to be reproduced and displayed by the television receiver 22.

A step S4 following the step S3 controls the PSI analyzer 11 to decide whether or not a component descriptor is present in the obtained descriptors. When a component descriptor is present, the computer program advances from the step S4 to a step S5. Otherwise, the computer program advances from the step S4 to a step S6.

The step S5 obtains a desired aspect ratio represented by the component descriptor. The step S5 sets a desired frame size in accordance with the desired aspect ratio. After the step S5, the computer program advances to a step S7.

The step S6 sets a desired frame size into correspondence with the normal display mode. After the step S6, the computer program advances to the step S7.

The step S7 controls the control signal generator 14 to produce a frame size control signal representative of the desired frame size set by the step S5 or S6. The step S7 further controls the control signal generator 14 to output the frame size control signal to the television receiver 22.

A step S8 following the step S7 controls the PSI analyzer 11 to decide whether or not a content descriptor is present in the obtained descriptors. When a content descriptor is present, the computer program advances from the step S8 to a step S9. Otherwise, the computer program advances from the step S8 to a step S10.

The step S9 obtains a content program genre represented by the content descriptor. The step S9 sets a desired brightness of the interior lighting device 21 and a desired quality of pictures displayed by the television receiver 22 in accordance with the obtained content program genre by referring to the external-device control parameter table 12. After the step S9, the computer program advances to a step S11.

The step S10 sets a desired brightness of the interior lighting device 21 to the maximum level. In addition, the step S10 sets a desired quality of pictures displayed by the television receiver 22 to the standard-mode level. After the step S10, the computer program advances to the step S11.

The step S11 controls the control signal generator 13 to produce a brightness control signal representative of the desired brightness set by the step S9 or S10. The step S11 further controls the control signal generator 13 to output the brightness control signal to the interior lighting device 21.

A step S12 following the step S11 controls the control signal generator 14 to produce a picture quality control signal representative of the desired picture quality set by the step S9 or S10. The step S12 further controls the control signal generator 14 to output the picture quality control signal to the television receiver 22. After the step S12, the computer program returns to the step S1.

With reference back to FIG. 1, the television receiver 22 contains a controller 23. The controller 23 includes a computer having a combination of an input/output port, a CPU, a ROM, and a RAM. The device 23 serves to control various circuits in the television receiver 22. The controller 23 operates in accordance with a computer program stored in the ROM. The controller 23 can receive the frame size control signal and the picture quality control signal from the control signal generator 14 in the control apparatus 10.

FIG. 5 has flowcharts of first and second segments of the computer program for the controller 23. As shown in FIG. 5, a first step S13 of the first computer program segment decides whether or not a frame size control signal has come from the control apparatus 10. When a frame size control signal has come, the computer program advances from the step S13 to a step S14. Otherwise, the step S13 is repeated. Accordingly, the step S13 waits for a frame size control signal.

The step S14 takes in the frame size control signal. A step S15 following the step S14 detects the desired frame size represented by the frame size control signal.

A step S16 subsequent to the step S15 controls a frame size adjustment circuit in the television receiver 22 in response to the desired frame size so that an actual frame size in the television receiver 22 will be equal to the desired frame size. After the step S16, the computer program returns to the step S13.

As shown in FIG. 5, a first step S17 of the second computer program segment decides whether or not a picture quality control signal has come from the control apparatus 10. When a picture quality control signal has come, the computer program advances from the step S17 to a step S18. Otherwise, the step S17 is repeated. Accordingly, the step S17 waits for a picture quality control signal.

The step S18 takes in the picture quality control signal. A step S19 following the step S18 detects the desired picture quality represented by the picture quality control signal.

A step S20 subsequent to the step S19 controls a picture quality adjustment circuit in the television receiver 22 in response to the desired picture quality so that an actual quality of pictures displayed by the television receiver 22 will be equal to the desired picture quality. After the step S20, the computer program returns to the step S17.

With reference back to FIG. 1, the interior lighting device 21 contains a controller 24 and a light 25. The controller 24 includes a computer having a combination of an input/output port, a CPU, a ROM, and a RAM. The device 24 serves to control the brightness of the light 25. The controller 24 operates in accordance with a computer program stored in the ROM. The controller 24 can receive the brightness control signal from the control signal generator 13 in the control apparatus 10.

FIG. 5 has a flowchart of a segment of the computer program for the controller 24. As shown in FIG. 5, a first step S21 of the computer program segment decides whether or not a brightness control signal has come from the control apparatus 10. When a brightness control signal has come, the computer program advances from the step S21 to a step S22. Otherwise, the step S21 is repeated. Accordingly, the step S21 waits for a brightness control signal.

The step S22 takes in the brightness control signal. A step S23 following the step S22 detects the desired brightness represented by the brightness control signal.

A step S24 subsequent to the step S23 controls the light 25 in response to the desired brightness so that the actual brightness of the light 25 will be equal to the desired brightness. After the step S24, the computer program returns to the step S21.

As understood from the above description, for each content program genre, the user can set the desired brightness of the interior lighting device 21 and the desired quality of pictures displayed by the television receiver 22 according to user's preference. The desired brightness and the desired picture quality set for each content program genre are registered in the external-device control parameter table 12. The PSI is extracted from the received TS. The extracted PSI is searched for the content descriptor related to the desired content program. The content program genre is detected by referring to the content descriptor. The external-device control parameter table 12 is accessed in response to the detected content program genre so that information about the desired brightness and the desired picture quality corresponding to the detected content program genre is read out therefrom. The desired brightness and the desired picture quality are notified to the interior lighting device 21 and the television receiver 22, respectively. The actual brightness of the interior lighting device 21 is equalized to the desired brightness. The actual picture quality in the television receiver 22 is equalized to the desired picture quality. Accordingly, the actual brightness of the interior lighting device 21 and the actual picture quality in the television receiver 22 can be controlled at the respective desired levels set by the user. Furthermore, the content descriptor in the PSI can be effectively utilized.

In addition, the extracted PSI is searched for the component descriptor related to the desired content program. The desired frame size is decided according to the component descriptor. The desired frame size is notified to the television receiver 22. The actual frame size in the television receiver 22 is equalized to the desired frame size. Therefore, the actual frame size in the television receiver 22 can be automatically changed in accordance with the desired content program. Furthermore, the component descriptor in the PSI can be effectively utilized.

The television receiver 22 has a section for reproducing sound of the desired content program, and circuits for controlling conditions of the reproduced sound such as the loudness and the selection of either the stereophonic mode or the monaural mode. It should be noted that the external-device control parameter table 12 may be modified to additionally provide a user settable relation of the content program genre with a desired loudness of reproduced sound and a desired selection of either the stereophonic mode or the monaural mode. In this case, the loudness of the reproduced sound and the selection of either the stereophonic mode or the monaural mode may be controlled in response to the genre of the desired content program through the use of a prescribed descriptor or descriptors extracted by the control apparatus 10.

Second Embodiment

Figure 6:
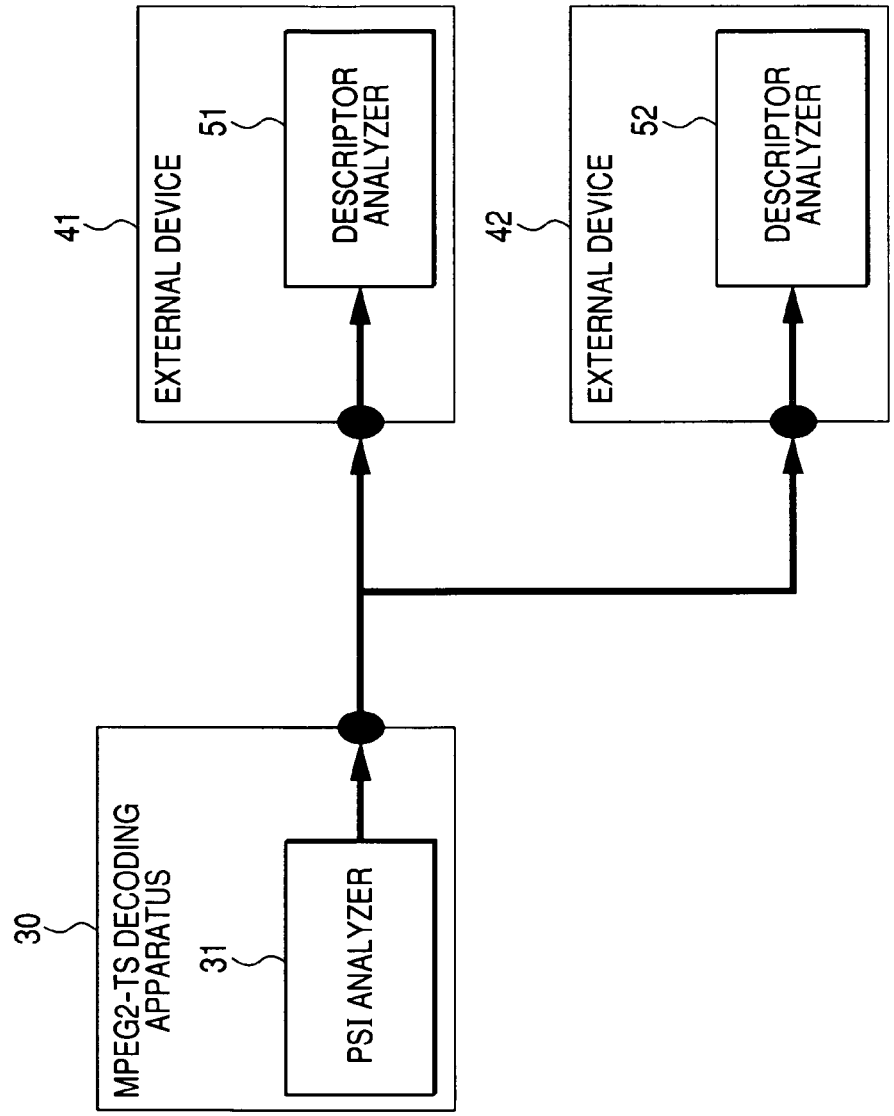
FIG. 6 is a block diagram of a system including an MPEG2-TS decoding apparatus and external devices according to a second embodiment of this invention.

FIG. 6 shows a system according to a second embodiment of this invention. The system of FIG. 6 includes an MPEG2-TS decoding apparatus 30, and external devices 41 and 42 connected with the decoding apparatus 30. The connection among the decoding apparatus 30 and the external devices 41 and 42 is of a wireless type or a wired type. The decoding apparatus 30 is, for example, a VDR. The decoding apparatus 30 serves as an external-device control apparatus.

The external device 41 contains a descriptor analyzer 51 for analyzing a descriptor. The external device 41 operates in response to the result of the descriptor analyzation. Similarly, the external device 42 contains a descriptor analyzer 52 for analyzing a descriptor. The external device 42 operates in response to the result of the descriptor analyzation.

The decoding apparatus 30 is similar to the control apparatus 10 of FIG. 1 except for design changes mentioned hereafter. The decoding apparatus 30 contains a PSI analyzer 31 for making a decision as to PSI and extracting descriptors from the PSI. The decoding apparatus 30 further contains a communication interface or a transmitter. The extracted descriptors are sent from the PSI analyzer 31 to the external devices 41 and 42 via the communication interface or the transmitter on a wireless basis or a wired basis under the control by a computer-based controller in the decoding apparatus 30. It should be noted that the decoding apparatus 30 does not analyze the extracted descriptors.

The external device 41 contains a communication interface or a receiver for accepting descriptors sent from the decoding apparatus 30. Similarly, the external device 42 contains a communication interface or a receiver for accepting descriptors sent from the decoding apparatus 30.

The controller in the decoding apparatus 30 serves to control the PSI analyzer 31 and the communication interface or the transmitter. The controller in the decoding apparatus 30 operates in accordance with a computer program stored therein. The external device 41 contains a computer-based controller for controlling the descriptor analyzer 51, the communication interface or the receiver, and other circuits. The controller in the external device 41 operates in accordance with a computer program stored therein. Similarly, the external device 42 contains a computer-based controller for controlling the descriptor analyzer 52, the communication interface or the receiver, and other circuits. The controller in the external device 42 operates in accordance with a computer program stored therein. Either the external device 41 or the external device 42 is handled as an optional device 40.

Figure 7:
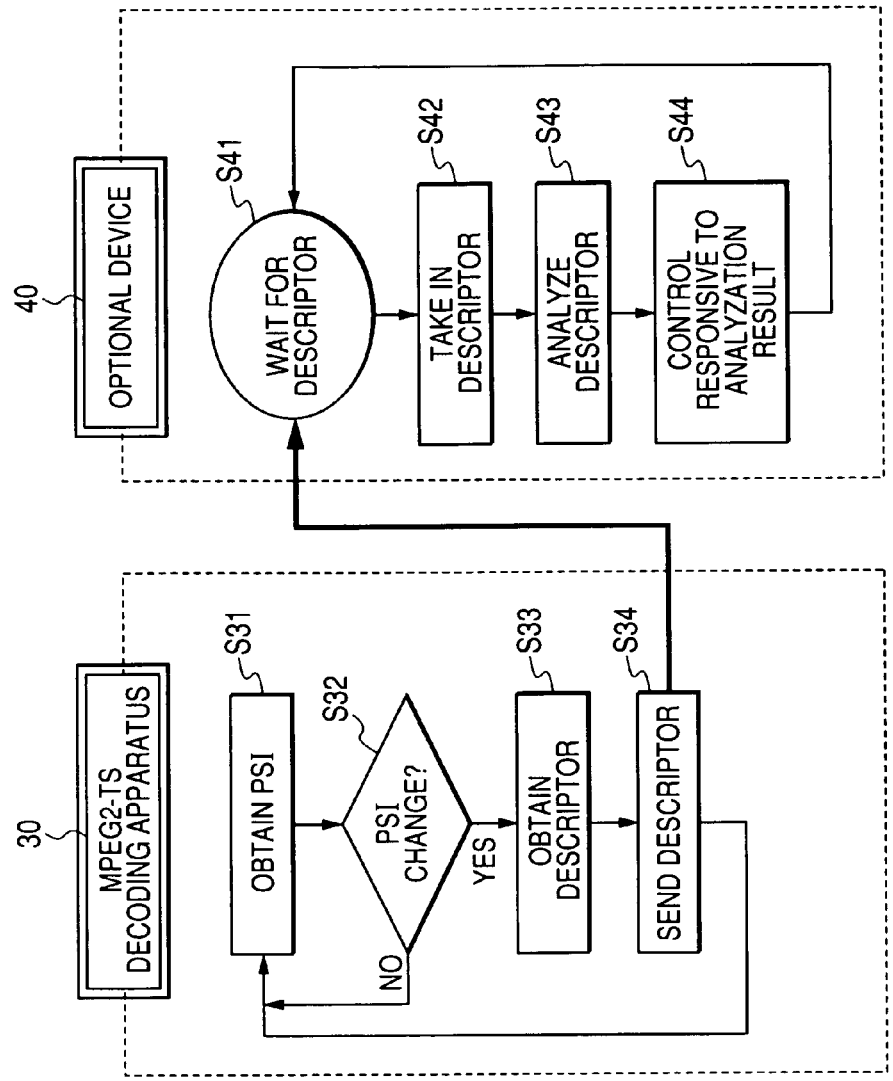
FIG. 7 is a diagram having flowchart of segments of computer programs for controllers in the MPEG2-TS decoding apparatus and an optional device in the second embodiment of this invention.

FIG. 7 has a flowchart of a segment of the computer program for the controller in the decoding apparatus 30. As shown in FIG. 7, a first step S31 of the computer program segment controls an MPEG2-TS decoder in the decoding apparatus 30 to extract PSI from a received TS.

A step S32 following the step S31 controls the PSI analyzer 31 to decide whether or not the current extracted PSI is changed from the last extracted PSI. When the current extracted PSI is changed from the last extracted PSI, the computer program advances from the step S32 to a step S33. Otherwise, the computer program returns from the step S32 to the step S31.

The step S33 controls the PSI analyzer 31 to obtain, from the current extracted PSI, all descriptors in a PMT (a program map table) and a SIT (a selection information table) related to a content program which is being received or reproduced.

A step S34 following the step S3 controls the communication interface or the transmitter to send the obtained descriptors to the optional device 40. After the step S34, the computer program returns to the step S31.

FIG. 7 has a flowchart of a segment of the computer program for the controller in the optional device 40. As shown in FIG. 7, a first step S41 of the computer program segment accesses the communication interface or the receiver to decide whether or not descriptors have come from the decoding apparatus 30. When descriptors have come, the computer program advances from the step S41 to a step S42. Otherwise, the step S41 is repeated. Accordingly, the step S41 waits for descriptors.

The step S42 controls the communication interface or the receiver to take in the descriptors.

A step S43 following the step S42 controls the descriptor analyzer 51 or 52 to select one or ones from the descriptors which relate to the functions of controllable circuits in the optional device 40. The step S43 further controls the descriptor analyzer 51 or 52 to analyze the selected descriptor or descriptors.

A step S44 subsequent to the step S43 controls the controllable circuits in response to the result of the analyzation of the selected descriptor or descriptors. After the step S44, the computer program returns to the step S41.

As mentioned above, descriptors in a PMT and a SIT relating to a content program which is being received or reproduced are sent from the decoding apparatus 30 to the optional device 40, that is, the external device 41 or 42. It is easy to add another optical device (another external device) on a tree basis which utilizes the contents of a descriptor or descriptors.

Preferably, the communication interfaces in the decoding apparatus 30 and the external devices 41 and 42 comply with the Bluetooth wireless specification, the Home RF standards, or the Home Plug standards.

A short event descriptor has information representing the name of a content program and a brief explanation thereof. In the case where there are two optional devices 40 including a disc recorder (for example, a BD recorder) and a label printer, the decoding apparatus 30 can control the label printer to automatically make a seal to be attached to a content-program-recorded disc by referring to information represented by a short event descriptor related to a recorded content program. Furthermore, in the case where the label printer is capable of directly printing a label on a disc through the use of laser light, the decoding device 30 can control the label printer to implement label printing after the recording of a desired content program on the disc. Printed labels are useful to arrange the library of content-program recorded discs.

Third Embodiment

Figure 8:
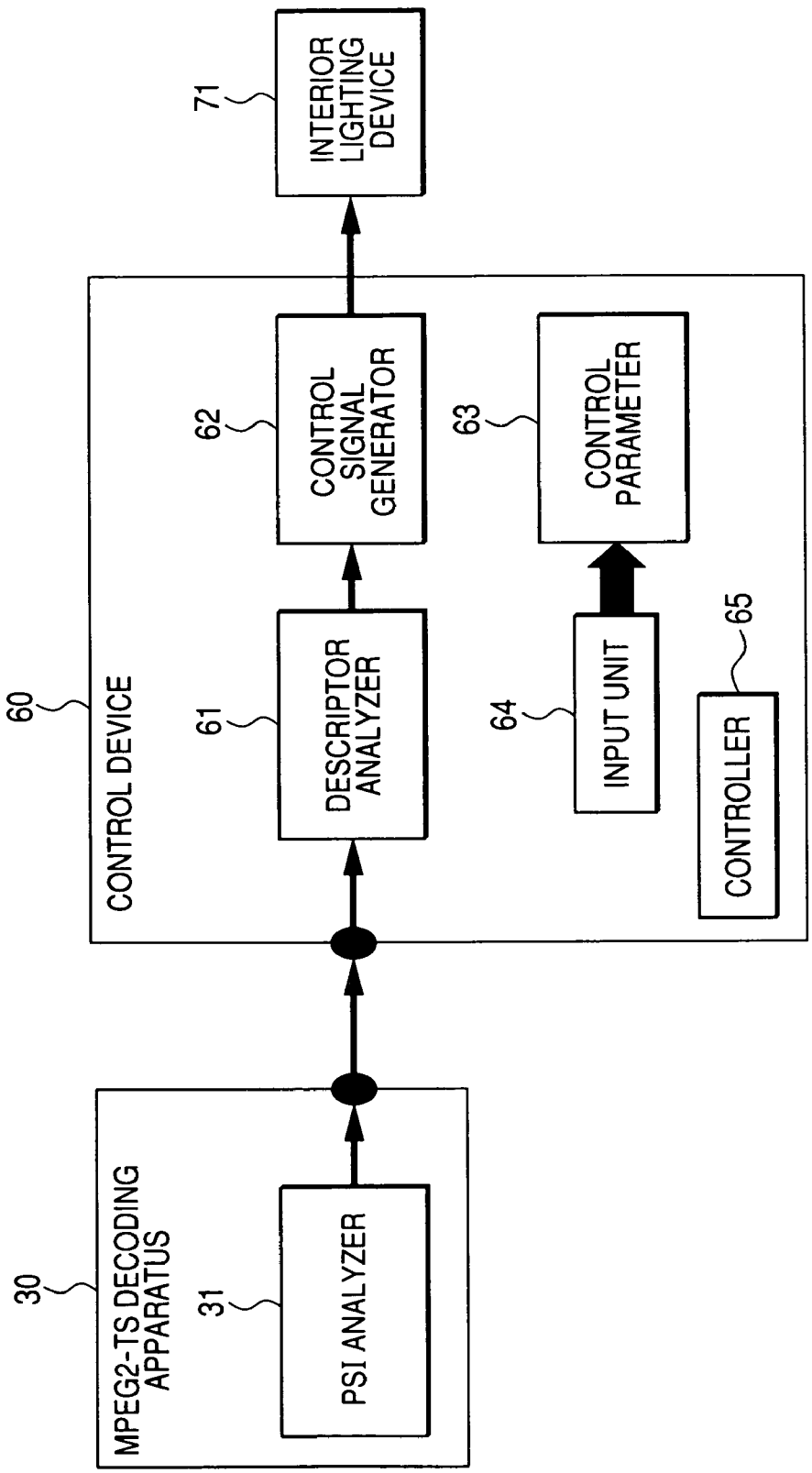
FIG. 8 is a block diagram of a system including an MPEG2-TS decoding apparatus, a control device, and an interior lighting device according to a third embodiment of this invention.

FIG. 8 shows a system according to a third embodiment of this invention. The system of FIG. 8 is similar to that of FIG. 6 except for design changes mentioned hereafter.

The system of FIG. 8 includes a control device 60 and an interior lighting device 71 in addition to the decoding apparatus 30. The control device 60 is handled as an external device with respect to the decoding apparatus 30 which corresponds to the external device 41 or 42 in FIG. 6.

The control device 60 and the interior lighting device 71 are connected. The control device 60 serves to control the interior lighting device 71.

The control device 60 includes a descriptor analyzer 61, a control signal generator 62, a memory storing a signal representative of a control parameter table 63, an input unit (a user interface) 64, and a computer-based controller 65. The control device 60 further includes a communication interface or a receiver for receiving descriptors from the decoding apparatus 30. The controller 65 serves to control the descriptor analyzer 61, the control signal generator 62, the memory, the input unit 64, and the communication interface or the receiver. The controller 65 operates in accordance with a computer program stored therein.

The controller 65 can read out the signal representative of the control parameter table 63 from the memory before sending the read-out signal to a display in the control device 60 or an external display. The signal representative of the control parameter table 63 can be visualized by the display.

The input unit 64 can be actuated by a user. The input unit 64 has, for example, an array of keys. When being actuated by the user, the input unit 64 generates a corresponding signal and outputs the generated signal to the controller 65. The controller 65 can access and update the control parameter table 63 in response to the output signal from the input unit 64. Thus, the user can set or update the contents of the control parameter table 63 by actuating the input unit 64.

Figure 9:
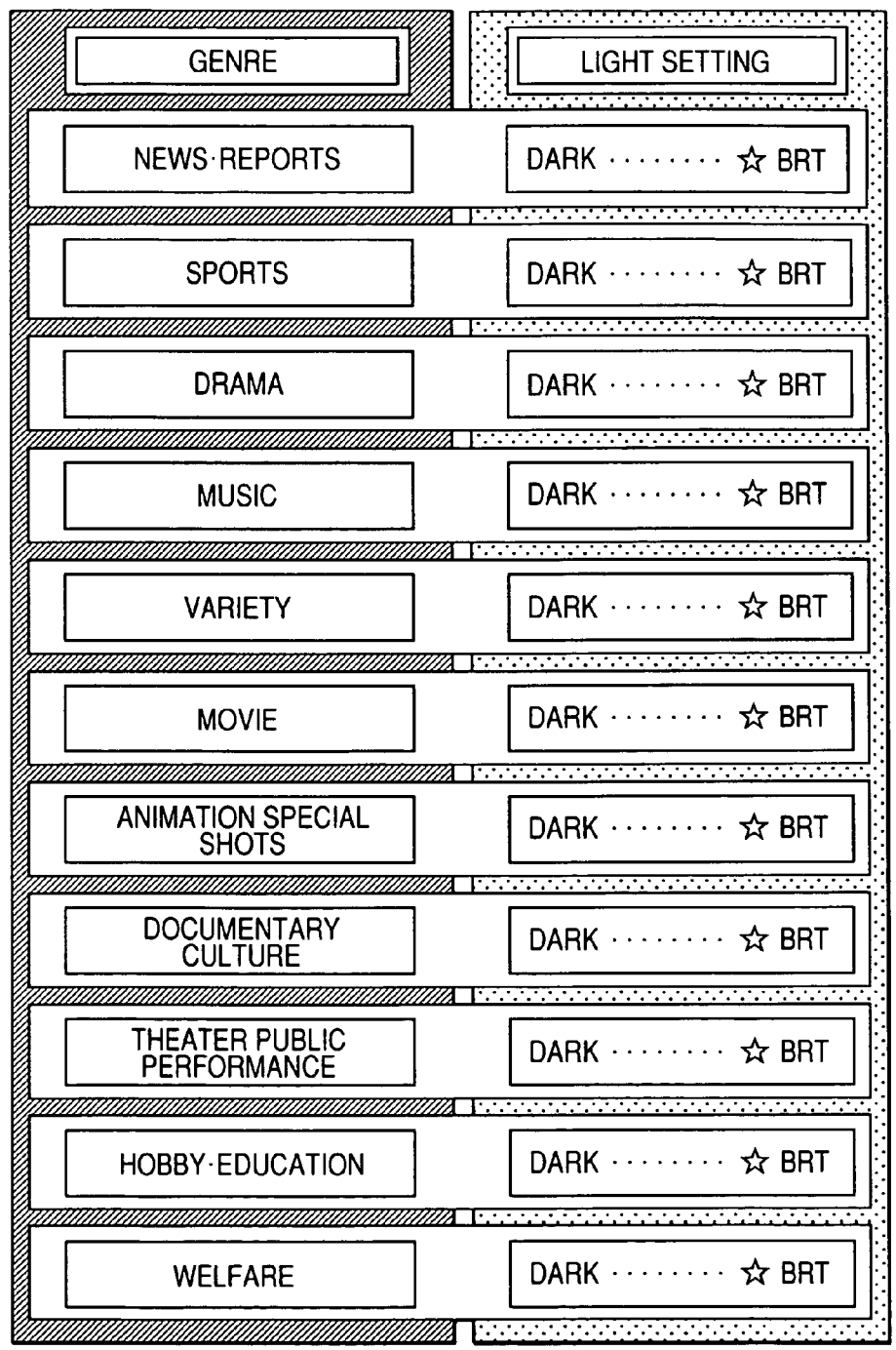
FIG. 9 is a plan view showing an example of an initial setting picture of a control parameter table.

The control parameter table 63 provides a user settable relation between a content program genre and a desired brightness of the interior lighting device 71. FIG. 9 shows an example of an initial setting picture of the control parameter table 63 which is indicated by the display. As shown in FIG. 9, the initial state of the contents of the control parameter table 63 is designed so that the desired brightness of the interior lighting device 71 will be equal to a maximum level regardless of the content program genre.

Figure 10:
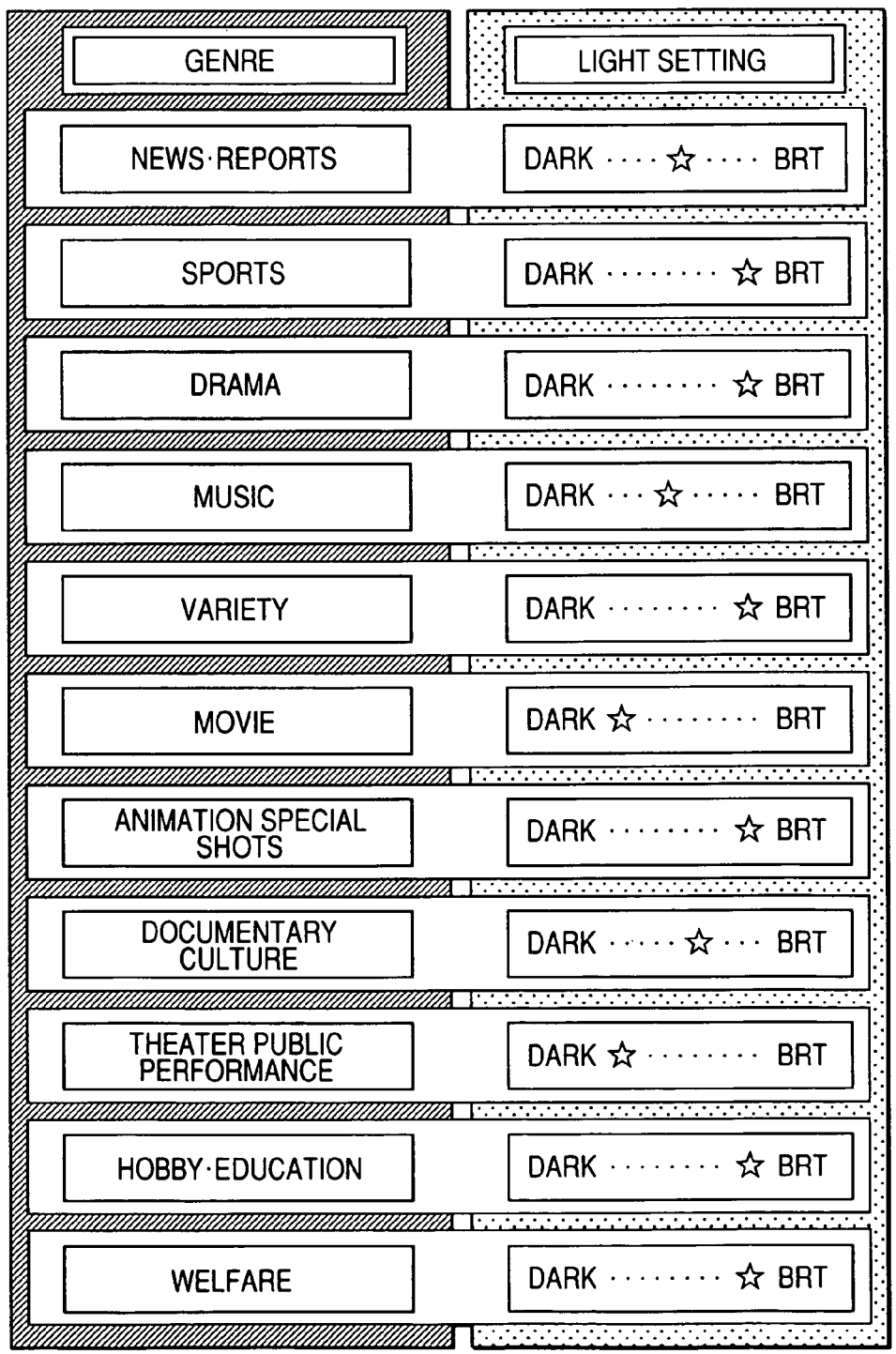
FIG. 10 is a plan view showing an example of a non-initial picture of the control parameter table which results from a change accorded with user's preference.

The contents of the control parameter table 63 can be changed or updated from the initial state in accordance with user's preference as the user actuates the input device 64. FIG. 10 shows an example of a non-initial picture of the control parameter table 63 which is indicated by the display, and which results from a change accorded with user's preference. As shown in FIG. 10, the non-initial state of the contents of the control parameter table 63 is such that the desired brightness of the interior lighting device 71 depends on the content program genre. In FIG. 10, the desired brightness of the interior lighting device 71 is equal to a minimum level for the content program genre "movie". The desired brightness of the interior lighting device 71 is equal to the maximum level for the content program genre "animation and special shots".

Figure 11:
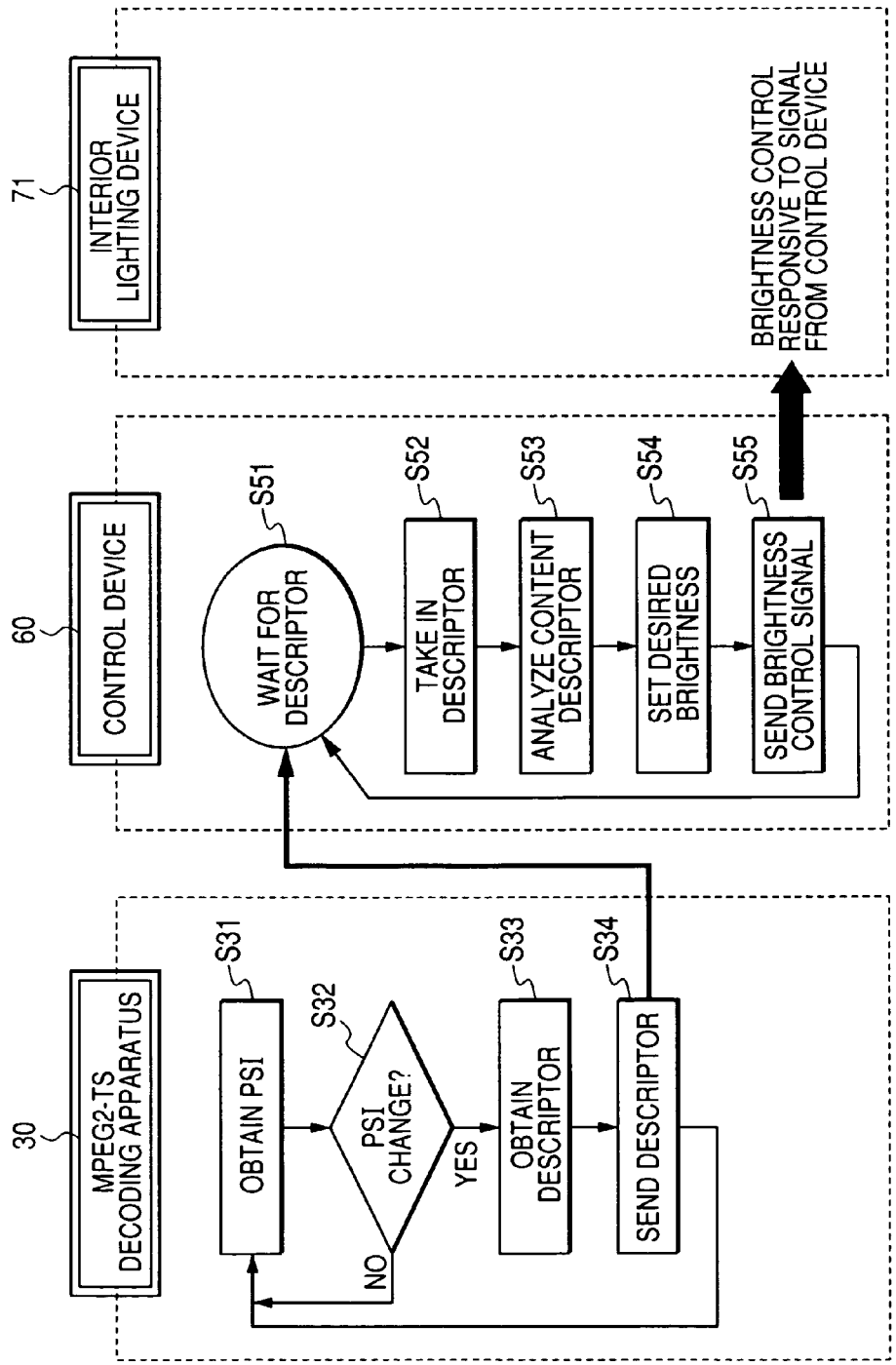
FIG. 11 is a diagram having flowchart of segments of computer programs for controllers in the MPEG2-TS decoding apparatus and the control device in FIG. 8.

FIG. 11 has a flowchart of a segment of the computer program for the controller 65 in the control device 60. As shown in FIG. 11, a first step S51 of the computer program segment accesses the communication interface or the receiver to decide whether or not descriptors have come from the decoding apparatus 30. When descriptors have come, the computer program advances from the step S51 to a step S52. Otherwise, the step S51 is repeated. Accordingly, the step S51 waits for descriptors.

The step S52 controls the communication interface or the receiver to take in the descriptors.

A step S53 following the step S52 controls the descriptor analyzer 61 to select a content descriptor from the taken-in descriptors. The step S53 further controls the descriptor analyzer 61 to obtain a content program genre represented by the content descriptor.

A step S54 subsequent to the step S53 sets a desired brightness of the interior lighting device 71 in accordance with the obtained content program genre by referring to the control parameter table 63.

A step S55 controls the control signal generator 62 to produce a brightness control signal representative of the desired brightness set by the step S54. The step S55 further controls the control signal generator 62 to output the brightness control signal to the interior lighting device 71. After the step S55, the computer program returns to the step S51.

Basically, the interior lighting device 71 is similar to the interior lighting device 21 in FIG. 1. The actual brightness of the interior lighting device 71 is controlled at the desired brightness represented by the brightness control signal outputted from the control device 60.

Preferably, the communication interfaces in the decoding apparatus 30 and the control device 60 comply with the Bluetooth wireless specification, the Home RF standards, or the Home Plug standards.

Fourth Embodiment

Figure 12:
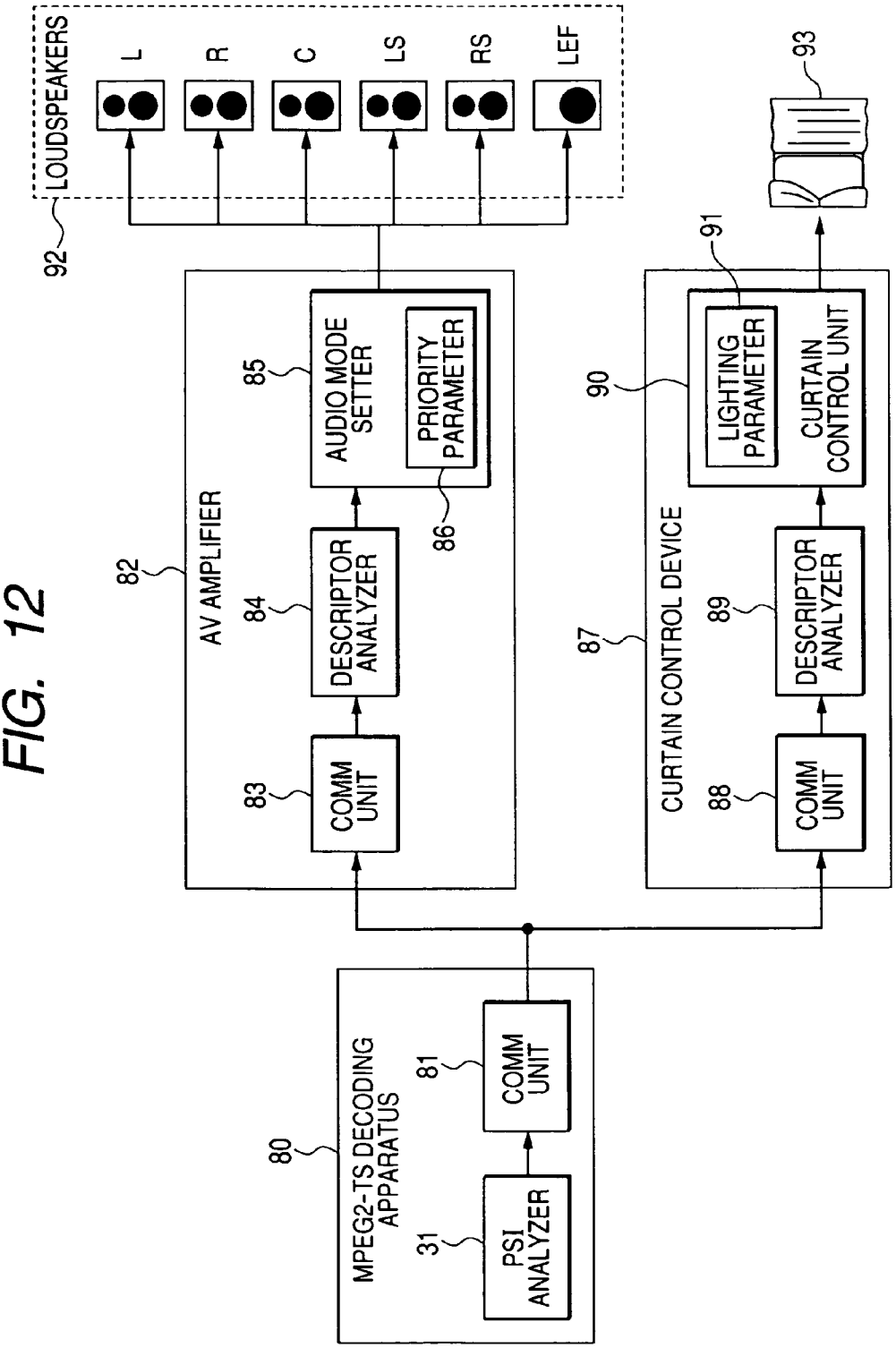
FIG. 12 is a diagram showing a system including an MPEG2-TS decoding apparatus, an AV amplifier, a curtain control device, loudspeakers, and a curtain according to a fourth embodiment of this invention.

FIG. 12 shows a system according to a fourth embodiment of this invention. The system of FIG. 12 includes an MPEG2-TS decoding apparatus 80, an AV amplifier 82, a curtain control device 87, loudspeakers 92, and a curtain 93. The AV amplifier 82 and the curtain control device 87 are connected with the decoding apparatus 80. The connection among the decoding apparatus 80, the AV amplifier 82, and the curtain control device 87 is of a wireless type or a wired type. The loudspeakers 92 are connected to the AV amplifier 82. The curtain 93 is connected with the curtain control device 87.

The decoding apparatus 80 is, for example, a VDR. The decoding apparatus 80 serves as an external-device control apparatus. The decoding apparatus 80 is similar to the decoding apparatus 30 in FIG. 6 except for design changes mentioned hereafter. The decoding apparatus 80 decodes a received MPEG2-TS into audio signals of a desired content program. The decoding apparatus 80 sends the audio signals to the AV amplifier 82.

The AV amplifier 82 is handled as an optional device or an external device with respect to the decoding apparatus 80. The device 82 amplifies the audio signals from the decoding apparatus 80 to get analog amplification-resultant audio signals of "L", "R", "C", "LS", "RS", and "LEF" channels. The loudspeakers 92 include L-channel loudspeakers, R-channel loudspeakers, C-channel loudspeakers, LS-channel loudspeakers, RS-channel loudspeakers, and an LEF-channel loudspeaker. The analog amplification-resultant audio signals of "L", "R", "C", "LS", "RS", and "LEF" channels are fed from the AV amplifier 82 to the L-channel loudspeakers, the R-channel loudspeakers, the C-channel loudspeakers, the LS-channel loudspeakers, the RS-channel loudspeakers, and the LEF-channel loudspeaker, respectively.

The curtain control device 87 is handled as an optional device or an external device with respect to the decoding apparatus 80. The curtain 93 includes an actuator for moving a piece of curtain cloth between a fully open position and a fully closed position. The curtain control device 87 serves to drive the actuator of the curtain 93 to control the position of the piece of curtain cloth, that is, the degree of opening of the curtain 93.

Descriptors related to each content program include an audio component descriptor having information representing the audio channel number of the content program. From descriptors related to a content program which is being received or reproduced, it is possible to obtain information about the genre and the audio channel number of the content program. When the obtained information indicates that the genre of the content program is "movie" and the audio channel number thereof corresponds to "5.1 ch", the AV amplifier 82 can be controlled to operate in a "5.1 ch" mode and the curtain control device 87 can be controlled to fully close the curtain 93. When the obtained information indicates that the genre of the content program is "news", the AV amplifier 82 can be controlled to operate in a monaural mode or a stereophonic mode.

The decoding apparatus 80 contains a communication unit 81 in addition to the PSI analyzer 31. The communication unit 81 serves as a communication interface.

The AV amplifier 82 contains a communication unit 83, a descriptor analyzer 84, and an audio mode setter 85. The communication interface 83 serves as a communication interface. The audio mode setter 85 includes a memory storing a signal representing a priority parameter table 86 indicating the desired degrees of priority of respective surround formats which depend on the audio channel number of a content program. The priority parameter table 86 can be changed or updated in accordance with user's preference as the user actuates an input unit (a user interface) in the AV amplifier 82. The descriptor analyzer 84 implements the analyzation of a descriptor. The descriptor analyzer 84 notifies the result of the analyzation to the audio mode setter 85. The audio mode setter 85 sets an audio mode of operation of the AV amplifier 82 and controls surround-related conditions of the loudspeakers 92 by referring to the priority parameter table 86 in response to the analyzation result. Specifically, the audio setter 85 sets a desired audio mode by referring to the priority parameter table 86 in response to the analyzation result, and drives the loudspeakers 92 in accordance with the desired audio mode.

The curtain control device 87 contains a communication unit 88, a descriptor analyzer 89, and a curtain control unit 90. The communication unit 88 serves as a communication interface. The curtain control unit 90 includes a memory storing a signal representing a lighting parameter table 91 providing a user settable relation between a content program genre and a desired degree of opening of the curtain 93. The lighting parameter table 91 can be changed or updated in accordance with user's preference as the user actuates the input unit (the user interface). The descriptor analyzer 89 implements the analyzation of a descriptor. The descriptor analyzer 89 notifies the result of the analyzation to the curtain control unit 90. For a content program which is being received or reproduced, the curtain control unit 90 determines a desired degree of opening of the curtain 93 on the basis of the analyzation result by referring to the lighting parameter table 91. The curtain control unit 90 drives the actuator of the curtain 93 in response to the desired degree of opening so that the actual degree of opening of the curtain 93 will be equal to the desired degree.

The communication units 81, 83, and 88 comply with, for example, the Bluetooth wireless specification. The communication units 81, 83, and 88 can implement radio communications with each other. The implemented radio communications use a prescribed frequency band, for example, a 2.4-GHz band, and have a transfer rate of up to 3 Mbps. The radio communication service area covered by each of the communication units 81, 83, and 88 has a radius in the range of about 10 meters to 100 meters.

The decoding apparatus 80 includes a computer-based controller for controlling an MPEG2-TS decoder, the PSI analyzer 31, and the communication unit 81. The controller operates in accordance with a computer program stored therein.

Figure 13:
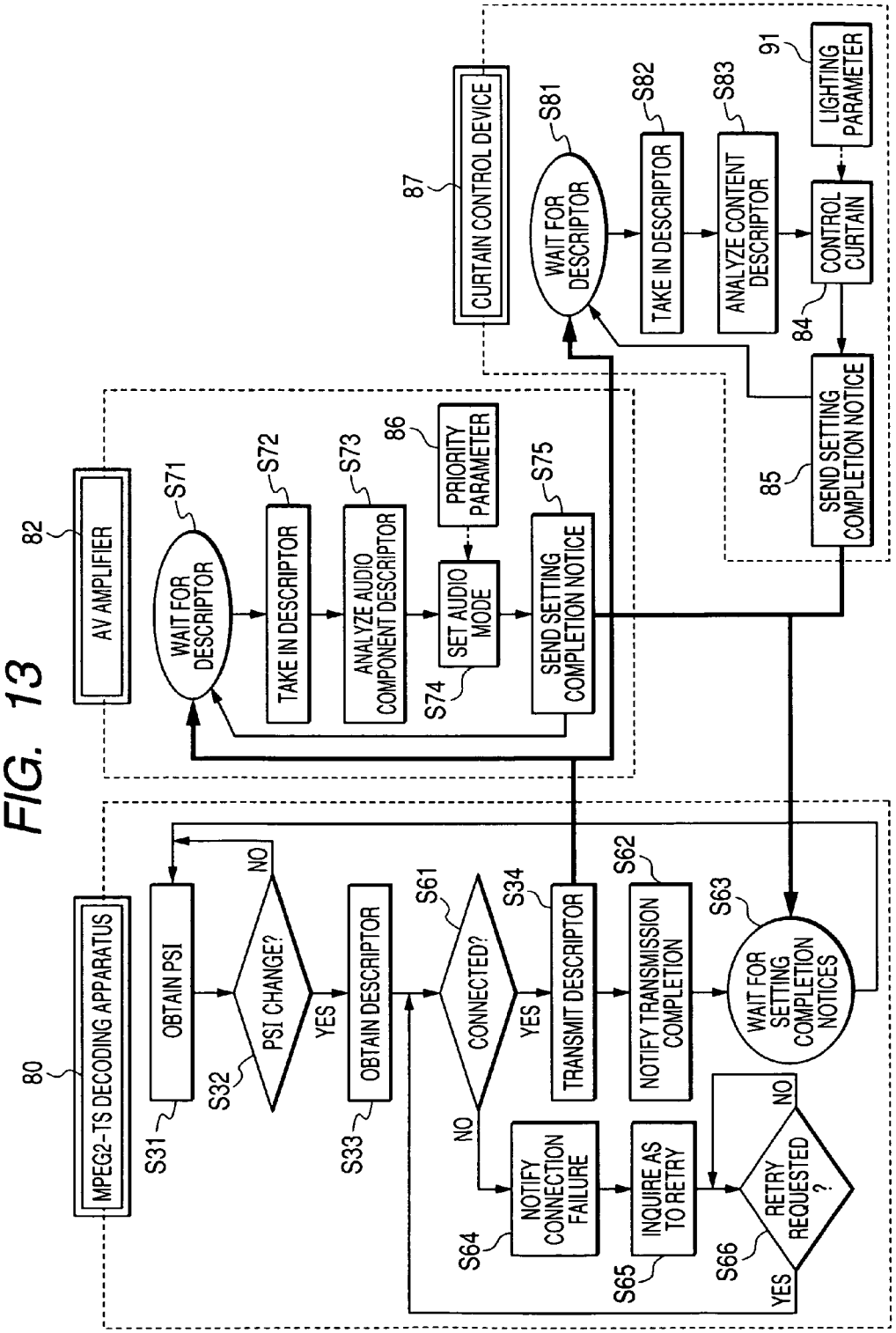
FIG. 13 is a diagram having flowchart of segments of computer programs for controllers in the MPEG2-TS decoding apparatus, the AV amplifier, and the curtain control device in FIG. 12.

FIG. 13 has a flowchart of a segment of the computer program for the controller in the decoding apparatus 80. As shown in FIG. 13, a first step S31 of the computer program segment controls an MPEG2-TS decoder in the decoding apparatus 80 to extract PSI from a received TS.

A step S32 following the step S31 controls the PSI analyzer 31 to decide whether or not the current extracted PSI is changed from the last extracted PSI. When the current extracted PSI is changed from the last extracted PSI, the computer program advances from the step S32 to a step S33. Otherwise, the computer program returns from the step S32 to the step S31.

The step S33 controls the PSI analyzer 31 to obtain, from the current extracted PSI, all descriptors in a PMT (a program map table) and a SIT (a selection information table) related to a content program which is being received or reproduced. After the step S33, the computer program advances to a step S61.

The step S61 controls the communication unit 81 to establish connection with the communication opposite parties (the AV amplifier 82 and the curtain control device 87). The step S61 accesses the communication unit 81 to decide whether or not the connection is successful. When the connection is successful, the computer program advances from the step S61 to a step S34. Otherwise, the computer program advances from the step S61 to a step S64.

The step S34 controls the communication unit 81 to transmit the obtained descriptors to the communication opposite parties.

A step S62 following the step S34 controls a display in the decoding apparatus 80 or a display outside the decoding apparatus 80 to indicate to a user the completion of transmission of the descriptors.

A step S63 subsequent to the step S62 accesses the communication unit 81 to decide whether or not setting completion notices have come from the communication opposite parties (the AV amplifier 82 and the curtain control device 87). When setting completion notices have come, the computer program returns from the step S63 to the step S31. Otherwise, the step S63 is repeated. Accordingly, the step S63 waits for setting completion notices.

The step S64 controls the display to indicate the failure in the connection to the user.

A step S65 following the step S64 controls the display to inquire of the user whether or not establishing connection with the communication opposite parties should be retried.

A step S66 subsequent to the step S65 accesses an input unit (a user interface) in the decoding apparatus 80 to decide whether or not the input unit is actuated by the user to retry establishing connection. When the input unit is actuated by the user to retry establishing connection, the computer program returns from the step S66 to the step S61. Otherwise, the step S66 is repeated.

The AV amplifier 82 includes a computer-based controller for controlling the communication unit 83, the descriptor analyzer 84, and the audio mode setter 85. The controller operates in accordance with a computer program stored therein.

FIG. 13 has a flowchart of a segment of the computer program for the controller in the AV amplifier 82. As shown in FIG. 13, a first step S71 of the computer program segment accesses the communication unit 83 to decide whether or not descriptors have come from the decoding apparatus 80. When descriptors have come, the computer program advances from the step S71 to a step S72. Otherwise, the step S71 is repeated. Accordingly, the step S71 waits for descriptors.

The step S72 controls the communication unit 83 to take in the descriptors.

A step S73 following the step S72 controls the descriptor analyzer 84 to select an audio content descriptor from the taken-in descriptors. The step S73 further controls the descriptor analyzer 84 to detect the audio channel number of a desired content program (a currently reproduced or displayed content program) which is represented by the audio content descriptor.

A step S74 subsequent to the step S73 controls the audio mode setter 85 to set a desired audio mode in accordance with the detected audio channel number by referring to the priority parameter table 86. The step S74 commands the audio mode setter 85 to drive the loudspeakers 92 in accordance with the desired audio mode.

A step S75 following the step S74 controls the communication unit 83 to send a setting completion notice to the decoding apparatus 80. After the step S75, the computer program returns to the step S71.

The curtain control device 87 includes a computer-based controller for controlling the communication unit 88, the descriptor analyzer 89, and the curtain control unit 90. The controller operates in accordance with a computer program stored therein.

FIG. 13 has a flowchart of a segment of the computer program for the controller in the curtain control device 87. As shown in FIG. 13, a first step S81 of the computer program segment accesses the communication unit 88 to decide whether or not descriptors have come from the decoding apparatus 80. When descriptors have come, the computer program advances from the step S81 to a step S82. Otherwise, the step S81 is repeated. Accordingly, the step S81 waits for descriptors.

The step S82 controls the communication unit 88 to take in the descriptors.

A step S83 following the step S82 controls the descriptor analyzer 89 to select a content descriptor from the taken-in descriptors. The step S83 further controls the descriptor analyzer 89 to obtain a content program genre represented by the content descriptor.

A step S84 subsequent to the step S83 commands the curtain control unit 90 to set a desired degree of opening of the curtain 93 in accordance with the obtained content program genre by referring to the lighting parameter table 91. Then, the step S84 further commands the curtain control unit 90 to drive the actuator of the curtain 93 in response to the desired degree of opening so that the actual degree of opening of the curtain 93 will be equal to the desired degree.

A step S85 following the step S84 controls the communication unit 88 to send a setting completion notice to the decoding apparatus 80. After the step S85, the computer program returns to the step S81.

Figure 14:
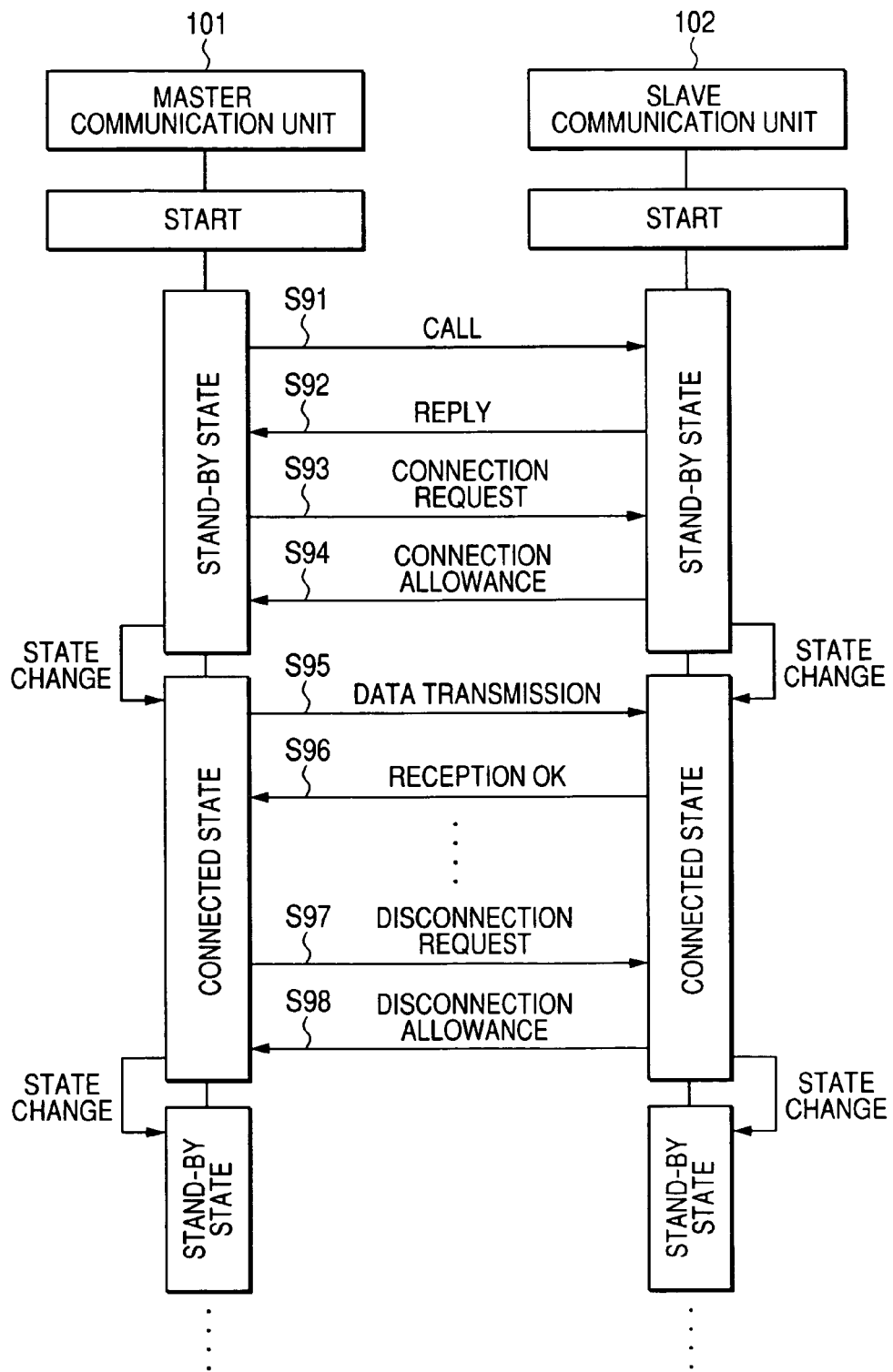
FIG. 14 is a diagram of a sequence of steps in communications between two of communication units within the MPEG2-TS decoding apparatus, the AV amplifier, and the curtain control device in FIG. 12.

During the communications between two of the communication units 81, 83, and 88, the two serve as a master and a slave respectively. With reference to FIG. 14, there is a master communication unit 101 and a slave communication unit 102 which are two of the communication units 81, 83, and 88.

As shown in FIG. 14, the master and slave communication units 101 and 102 fall into stand-by states and wait for connection requests after starting. When the master communication unit 101 is in the stand-by state, the master communication unit 101 sends a call signal to the slave communication unit 102 at a step S91. The call signal indicates an appointed communication unit which the master communication unit 101 desires to connect with. When the slave communication unit 102 is the appointed communication unit, the slave communication unit 102 returns a reply signal to the master communication unit 101 at a step S92.

In the case where the master communication unit 101 does not receive a reply signal during a prescribed time interval, the master communication unit 101 decides that the appointed communication unit is absent or unavailable. In this case, the master communication unit 101 indicates the failure in the connection to the user (for example, the step S64 in FIG. 13) and does not proceed with the communication procedure.

When a reply signal comes, the master communication unit 101 sends a connection request signal to the slave communication unit 102 at a step S93. Upon the reception of the connection request signal, the slave communication unit 102 returns a connection allowance signal to the master communication unit 101 at a step S94. As a result, the connection between the master and slave communication units 101 and 102 is established. When the connection is established, the master and slave communication units 101 and 102 change from the stand-by states to connected states.

The master communication unit 101 is allowed to send data to the slave communication unit 102 when being in the connected state. Therefore, the master communication unit 101 sends data (descriptors) to the salve communication unit 102 at a step S95. When the reception of the data has been completed, the slave communication unit 102 sends the master communication unit 101 a message signal indicating that the data reception has been successful at a step S96.

In the case where data to be sent to the slave communication unit 102 is gone, the master communication unit 101 sends a disconnection request signal to the slave communication unit 102 at a step S97. Upon the reception of the disconnection request signal, the slave communication unit 102 returns a disconnection allowance signal to the master communication unit 101 at a step S98. Then, the master and slave communication units 101 and 102 to change from the connected states back to the stand-by states.

Fifth Embodiment

Figure 15:
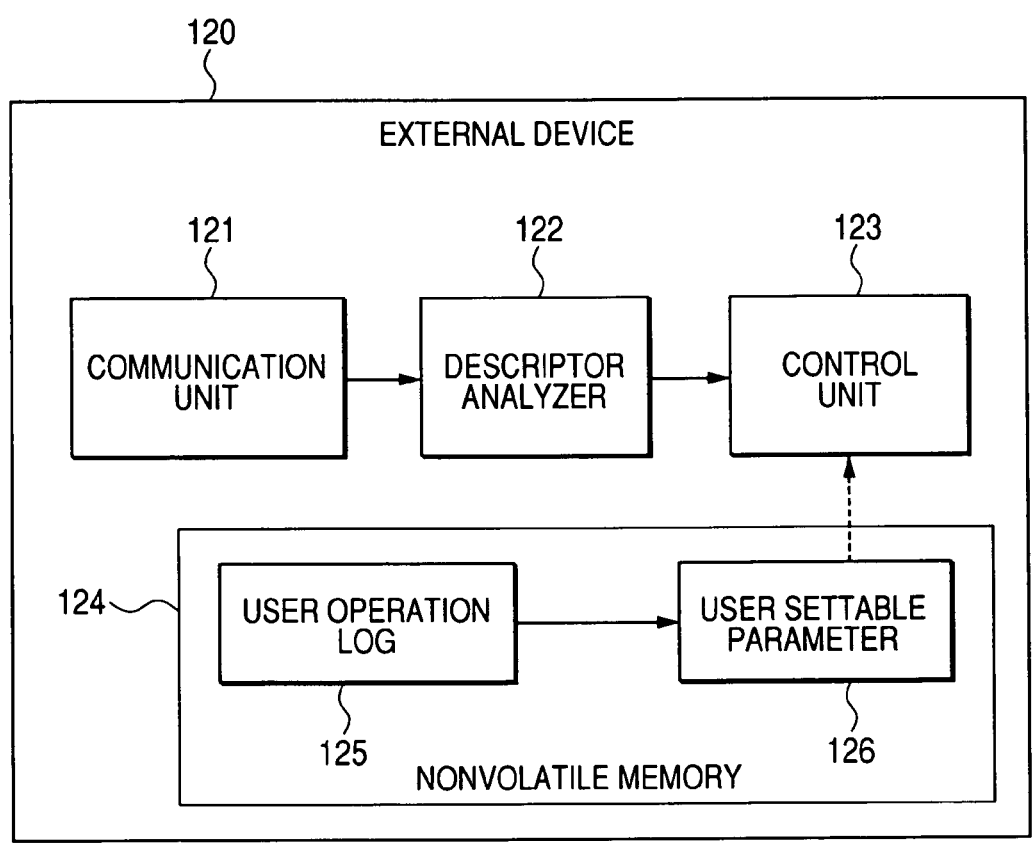
FIG. 15 is a block diagram of an external device according to a fifth embodiment of this invention.

FIG. 15 shows an external device 120 according to a fifth embodiment of this invention. The external device 120 can be used as at least a part of one of the external device 41 in FIG. 6, the external device 42 in FIG. 6, the optional device 40 in FIG. 7, the control device 60 in FIG. 8, the AV amplifier 82 in FIG. 12, or the curtain control device 87 in FIG. 12.

The external device 120 automatically implements control on the basis of information represented by a received descriptor. There is a possibility that the after-control state will be contrary to user's intention. In that case, the user will carry out a change by manually operating the external device 120.

The external device 120 has a resuming function including the steps of learning changes carried out by the user, and naturally providing a harmony with user's preference in response to the results of learning.

The external device 120 contains a communication unit 121, a descriptor analyzer 122, a control unit 123, and a nonvolatile memory 124. Descriptors are fed to the descriptor analyzer 122 through the communication unit 121. The device 122 analyzes the descriptors to get an analyzation result. The descriptor analyzer 122 notifies the analyzation result to the control unit 123. The nonvolatile memory 124 stores a signal representing a user operation log 125. Under the control by the control unit 123, information about changes carried out by the user is left in the user operation log 125 for an analyzed descriptor processed by the descriptor analyzer 122 and indicated by the analyzation result so that a pattern often employed by the user will be learned to get a learning result. A user settable parameter table 126 represented by a signal stored in the nonvolatile memory 124 is automatically updated in accordance with the learning result or the user operation log 125. The control unit 123 implements next setting in response to the analyzation result according to the updated parameter table 126.

The user settable parameter table 126 corresponds to the control parameter table 63 in FIG. 8, the priority parameter table 86 in FIG. 12, or the lighting parameter table 91 in FIG. 12.

Sixth Embodiment

A sixth embodiment of this invention is a combination of at least two selected from the first to fifth embodiments thereof.

What is claimed is:
1. A system comprising:
a decoding apparatus;
an external device connected to the decoding apparatus in a way complying with local wireless communication standards;
first means provided in the decoding apparatus for extracting a prescribed descriptor from program specific information in a transport stream;
second means for sending the prescribed descriptor extracted by the first means to the external device;
third means provided in the external device for analyzing information represented by the prescribed descriptor sent by the second means to obtain an analyzation result;
fourth means provided in the external device for storing an arbitrarily designated operation control parameter which relates to operation of a controllable portion in the external device;
fifth means provided in the external device for generating a signal for control of the operation of the controllable portion in the external device in response to the analyzation result obtained by the third means and the arbitrarily designated operation control parameter stored in the fourth means; and
sixth means provided in the external device for controlling the operation of the controllable portion in the external device in response to the signal generated by the fifth means.

2. A system as recited in claim 1, wherein the second means comprises means for detecting whether or not connection between the decoding apparatus and the external device is established, means for notifying a user of a connection failure when the connection between the decoding apparatus and the external device is not established, and means for sending the prescribed descriptor to the external device when the connection between the decoding apparatus and the external device is established, and wherein the external device includes means for sending a setting completion notice to the decoding apparatus when the sixth means completes the control of the operation of the controllable portion in the external device.

3. A system as recited in claim 1, wherein the external device includes means for analyzing a descriptor corresponding to a change through manual operation after the sixth means completes the control of the operation of the controllable portion in the external device, and generating an operation log in accordance with the analyzed descriptor, and means for updating the arbitrarily designated operation control parameter stored in the fourth means in accordance with the generated operation log.

4. A system comprising:
a decoding apparatus;
an external device;
first means provided in the decoding apparatus for extracting a prescribed descriptor from program specific information in a transport stream;
second means for sending the prescribed descriptor extracted by the first means to the external device;
third means provided in the external device for analyzing information represented by the prescribed descriptor sent by the second means to obtain an analyzation result;
fourth means provided in the external device for storing an arbitrarily designated operation control parameter which relates to operation of a controllable portion in the external device;
fifth means provided in the external device for generating a signal for control of the operation of the controllable portion in the external device in response to the analyzation result obtained by the third means and the arbitrarily designated operation control parameter stored in the fourth means; and
sixth means provided in the external device for controlling the operation of the controllable portion in the external device in response to the signal generated by the fifth means;
wherein the second means comprises means for detecting whether or not connection between the decoding apparatus and the external device is established, means for notifying a user of a connection failure when the connection between the decoding apparatus and the external device is not established, and means for sending the prescribed descriptor to the external device when the connection between the decoding apparatus and the external device is established, and wherein the external device includes means for sending a setting completion notice to the decoding apparatus when the sixth means completes the control of the operation of the controllable portion in the external device.

5. A system comprising:

a decoding apparatus;

an external device;

first means provided in the decoding apparatus for extracting a prescribed descriptor from program specific information in a transport stream;

second means for sending the prescribed descriptor extracted by the first means to the external device;

third means provided in the external device for analyzing information represented by the prescribed descriptor sent by the second means to obtain an analyzation result;

fourth means provided in the external device for storing an arbitrarily designated operation control parameter which relates to operation of a controllable portion in the external device;

fifth means provided in the external device for generating a signal for control of the operation of the controllable portion in the external device in response to the analyzation result obtained by the third means and the arbitrarily designated operation control parameter stored in the fourth means; and sixth means provided in the external device for controlling the operation of the controllable portion in the external device in response to the signal generated by the fifth means;

wherein the external device includes means for analyzing a descriptor corresponding to a change through manual operation after the sixth means completes the control of the operation of the controllable portion in the external device, and generating an operation log in accordance with the analyzed descriptor, and means for updating the arbitrarily designated operation control parameter stored in the fourth means in accordance with the generated operation log.

* * * * *